Patented Aug. 10, 1943

2,326,592

UNITED STATES PATENT OFFICE 2,326,592

PROCESS FOR REMOVING LEAD SULPHATE FROM TITANIUM SALT SOLUTIONS

Charles Russell Wicker, Wilmington, Del., assignor to E. I. du Pont de Nemours & Company, Wilmington, Del., a corporation of Delaware No Drawing. Application May 17, 1940, Serial No. 335,765

10 Claims. (Cl. 23—117)

This invention relates to novel methods for treating impurity-contaminated liquors or solutions in order to effect desirable purification of the same. More particularly, it relates to the production of relatively pure, hydrolyzable titanium salt solutions adapted for use in the production of titanium oxide pigments. More specifically, it relates to a novel method for purifying titanium sulphate solutions, in order that, on hydrolysis of the same, there may be readily obtained a relatively pure, lead-free hydrolysate suitable for conversion through calcination, to a high grade pigment.

In many commercial processes, particularly in the chemical, steel and pigment industries it is necessary that highly corrosive sulphuric acid or other strong mineral acidic liquors be employed. Because of the corrosive character of such liquors, it is necessary that lead or lead-lined equipment be used in such industries in order to minimize as far as possible the corrosion problems attending such liquor use. For example, in titanium oxide pigment production ground ilmenite or other titaniferous ore is suitably attacked by sulfuric acid and conversion effected of the iron and titanium values present in such ores to their respective sulphates. The liquors or solutions so employed are usually handled in lead or lead-lined, acid-resistant vessels, containers and conduits. While use of this type of equipment overcomes to a satisfactory extent the corrosion problems which would be otherwise encountered, the acidic liquors do exert some attack upon and consequent dissolution of a relatively small amount of the lead with which they necessarily come in contact. As a result, titanium salt solutions, such as, for instance, the sulphate, become contaminated with a small but objectionable amount of lead, usually lead sulphate. Although the amount of dissolved lead is relatively small and does not substantially affect the life of the apparatus or equipment, its presence in a titanium liquor to be hydrolyzed is very disadvantageous, for the reason the lead compound deposits with or becomes adsorbed upon the hydrolysate or precipitate obtained from the hydrolysis operation and remains in said precipitate throughout subsequent pigment processing, e. g., during the filtration, washing, calcining and pigment grinding operations. Obviously, the presence of a contaminating lead impurity in any quantity in the final pigment is oftentimes undesirable, due to the fact that it influences not only the properties and characteristics of said pigment, but seriously affects and limits to an objectionable extent the uses to which said pigment may be put. Thus, the amount of lead contaminant may be present in such quantity as to render the final pigment unfit for certain uses, especially in instances where a relatively pure white product is essential. For instance, when the lead contaminant is present in the pigment in such an infinitesimally low amount as 21 parts of lead per million, the titanium oxide pigment, because of express Governmental health regulations thereagainst, cannot be used in such important commercial applications as cosmetics, such as in face powders, soaps, skin creams, etc.

It is among the objects of this invention to overcome the disadvantages hereinabove alluded to and to provide a novel method for suitably purifying acidic liquors or salt solutions containing undesired amounts of lead or lead compounds as impurities. A particular object of the invention is to provide a novel method for purifying titanium sulphate solutions employed in the production of titanium oxide pigments, whereby the titanium hydrate precipitate recovered on the hydrolysis of said solutions will comprise a substantially lead-free product. A further object is to provide a process enabling manufacturers, especially those in the titanium pigment industry, to utilize leaded equipment in the solution preparation stages of the operation without the attendant disadvantage of producing a lead-contaminated final product. Other objects and advantages of the invention will be apparent from the ensuing description.

These and other objects are attainable in this invention, which embodies the discovery that when a lead-contaminated solution or acidic liquor is suitably treated with a finely-divided suspension of a nascent, insoluble compound, particularly an alkaline earth metal sulphate, or mixtures of the same, subsequent removal or separation of said sulphate from the liquor effects, quite unexpectedly, concurrent removal of the lead contaminant therefrom, due, in all probability, to the high affinity which the nascent sulphate apparently has for said impurity.

Although obviously not limited thereto, the invention will be described in connection with certain preferred adaptations thereof which involve the treatment of a titanium salt solution, especially titanium sulphate, prior to subjecting the same to hydrolysis in order to precipitate and recover therefrom raw pigment titanium oxide. Further, since nascent barium and strontium sulphates comprise agents which are particularly efficacious and preferred for use in the invention, I shall allude to such particular and preferred agents in describing my invention.

As is known, hydrolyzable titanium salt solutions may be obtained by following the procedures outlined in U. S. Patents 1,504,670, 2,111,788, 2,112,966 and 1,899,572-4. In the instance of titanium sulphate solution preparation, the same may be obtained by interacting ilmenite and sulphuric acid and the solution then suitably clarified, as contemplated, for instance, in said Patent 2,111,788. The solution which is obtained may contain in excess of substantially 100 g. $TiO_2$ per liter, and preferably from about 125 to 225 g. $TiO_2$ per liter, of solution. In accordance with the invention, said solution is then treated, at room or elevated temperatures, with a suitable quantity of a soluble alkaline earth metal compound in an amount sufficient to provide a relatively small concentration (ranging from substantially 1 to 10 g./l. of the alkaline earth metal for each 100 g. of $TiO_2$ present) of an insoluble alkaline earth metal sulphate, particularly those of barium or strontium; this arising by reason of the resulting reaction between said soluble compound and an equivalent amount of the sulphuric acid present in the solution being treated. Reactive alkaline earth metal compounds suitable for effecting such in situ generation of an insoluble, nascent alkaline earth metal sulphate include the hydroxides, carbonates, halides, chlorides, acetates, nitrates, sulphides, hydrosulphides, etc., or similar barium or strontium salts. While concentrations ranging from 1 to 10 g./l. of barium or strontium per 100 g. of $TiO_2$ are preferred, larger quantities may be used, if desired. Such larger concentrations will be found especially desirable in instances where a more concentrated titanium salt solution is being treated. In such latter instances, amounts ranging up to, say, 15 to 20 g. per liter or higher of alkaline earth metal for each 100 g. of $TiO_2$ may be employed. After suitable incorporation of the insoluble sulphate in the titanium solution, the resulting mixture or suspension is suitably agitated, preferably in a vigorous or violent manner, and for a prolonged period of, say, from 3 to 6 hours. At the conclusion of such agitation the suspended sulphate is removed from the liquor through settling followed by filtration or decantation of the settled liquid. The resulting purified liquor may be then subjected to convention hydrolysis, such as by the procedures of U. S. Reissue Patent 18,854 or 2,062,133 from which, it will be found, a relatively pure, lead-free precipitate will result.

To a more complete understanding of the invention, the following specific examples are given, these being in illustration, but not in limitation, of the invention:

*Example I*

A hydrolyzable titanium sulphate solution of the type normally used in the titanium pigment industry, containing about 150 g. $TiO_2$ per liter and in excess of 100 parts of lead for each million parts of $TiO_2$ present was treated with 7 parts by weight of barium in the form of a solution of barium hydrate for each 100 parts of dissolved $TiO_2$ present, whereby barium sulphate became formed in situ. The treated solution was then agitated for several hours and the suspended barium sulphate removed therefrom through settling, followed by filtration. An examination of the purified liquor prior to hydrolysis revealed that the same contained about 7% of the lead originally present in the solution. Upon hydrolyzing the purified liquor in a conventional manner, the resulting precipitate and final calcined titanium oxide pigment was found to be substantially free of objectionable lead compounds.

*Example II*

Example I was duplicated except that in lieu of barium hydroxide, 7 parts by weight of strontium, in the form of a solution of strontium chloride, for each 100 parts of dissolved $TiO_2$ present were used and, as a result, strontium sulphate became formed in situ. The treated titanium sulphate solution was purified to substantially the same extent as in Example I and the final hydrolysis precipitate and calcined $TiO_2$ pigment were likewise rendered substantially lead-free.

*Example III*

A titanium sulphate solution having a titanium concentration of 180 g. $TiO_2$ per liter prepared from ilmenite in a conventional manner, being clarified and having copperas removed therefrom, was treated with barium carbonate, employing 10 parts of barium per 100 parts of $TiO_2$ present in the solution. Prior to treatment, the titanium liquor containing about 110 parts of lead for each million parts of $TiO_2$. The treated solution was then agitated to effect conversion of the barium carbonate to barium sulphate and removal of the lead contaminant in the form of lead sulphate. After subjection to such treatment for a period of about 5 hours, the barium sulphate was removed from the solution by filtration. The purified solution was then hydrolyzed and finished in lead-free equipment. The hydrolysate precipitate and final, calcined $TiO_2$ pigment was found to contain less than 10 parts per million of lead and therefore to be satisfactory for use in cosmetic production.

*Example IV*

A titanium liquor substantially similar to that used in Example III was treated with a solution of barium sulphide, the amount of barium employed being 5 parts per 100 parts of dissolved titanium oxide present. The resulting suspension of barium sulphate was removed after being permitted to remain in contact with the solution for several hours. As a result of such treatment, substantially the same beneficial effects were attained as were produced in Example III.

*Example V*

A titanium solution similar to that used in Example IV was treated with 7 parts of barium in the form of barium chloride per 100 parts of $TiO_2$. The resulting barium sulphate suspension was allowed to remain in contact with the solution at a temperature of about 50° C. for several hours and was then removed by filtration. Tests for the presence of lead in the treated solution and in the barium sulphate revealed that substantially all of the lead present in said liquor had been removed and was present in the recovered barium sulphate.

*Example VI*

A titanium liquor substantially similar to that employed in Example IV was treated with 15 parts of freshly-precipitated barium sulphate per 100 parts of dissolved titanium oxide and the suspension maintained with accompanying agitation at a temperature of 60° C. for 4 hours. Thereupon, the barium sulphate was removed from the solution. An examination of the recovered blanc fixe disclosed that substantially complete removal from the solution of the contaminating lead had been effected.

As will be apparent, the invention is applicable to the purification of lead-containing sulphuric acid liquors generally, to remove lead contaminants therefrom, especially when such impurity is present as lead sulphate. It is particularly useful in the treatment of titanium salt solutions employed in the titanium pigment industry, especially hydrolyzable titanium sulphate solutions containing from about 50 to 150 parts or upwards of lead per million parts of $TiO_2$ present. As already noted, when the contaminant is present in an amount even as low as 21 parts of lead for each million parts of $TiO_2$, use of the final pigment in cosmetics is expressly prohibited. On hydrolysis, the lead contaminant occludes or becomes adsorbed on the $TiO_2$ precipitate to remain therein and objectionably contaminate the final calcined and finished pigment product. By this invention, relatively complete and satisfactory removal, to less than substantially 5 or 10 parts of lead per million, becomes effected, and, as a result, the pigment is rendered suitable for any desired use and especially in the cosmetic field.

Where use of the treating agent affects the normal acidity or pH of the solution under treatment to an undesired extent, it will be obvious that said solution may be returned to normal acidity by the mere addition or replacement of the acid used in effecting such precipitation of the alkaline earth sulphate. After removal of the lead contaminant from the titanium sulphate solution, the same may be then hydrolyzed in the usual and conventional manner and without modifying in any way the usual conditions of hydrolysis. As already explained, any change in the acidity conditions of the solution is merely incidental and but a function of the chemical selected for the formation of the insoluble sulphate. Obviously, lowering of the acidity by use of compounds such as barium hydrate, sulphide or carbonate, is not to be considered a prerequisite of the invention, but in fact in some instances it will be found desirable to avoid any substantial lowering of the ratio of titanium to active acid. Thus, it will be found that titanium solutions often become unstable when the molar ratio of titanium to $H_2SO_4$ (when using sulphate solutions) is substantially below 1 to 1.5. It will be found more desirable and safer to maintain at all times an active acid content in excess of substantially 3 g. equivalents for each gram atom of titanium contained in the solution. Preferably, it will be found more desirable to operate without ever causing the acidity to drop substantially below 3.4 g. equivalents of active acid for each gram of titanium (1.7 mols of $H_2SO_4$ for each mol of $TiO_2$).

As already noted, and because of their ready adaptability herein, barium and strontium sulphates comprise preferred types of agents for use in the invention. While these agents are preferred for use, calcium sulphate may also be employed, although the results attained by its use will be found to be somewhat less effective than when strontium and barium are resorted to. It appears rather difficult to explain just why insoluble strontium and barium sulphates appear to be more readily adapted for use in removing lead from acidic liquors, but it appears that these insoluble sulphates are physically somewhat similar to lead sulphate. Calcium sulphate, on the other hand, when precipitated at normal temperatures usually contains water of crystallization or appears as gysum, and its different physical structure may directly bear upon its ability to effect purification on a basis comparable to that of the other insoluble alkaline earth sulphates. Accordingly, although I generally contemplate use of all types of alkaline earth metal sulphates, in view of the fact more beneficial effects are obtained when an insoluble sulphate having a crystal structure substantially similar to that of lead sulphate is employed, I prefer to use such preferred barium and strontium sulphates and therefore recommend them in the invention when procurance of optimum results and benefits hereunder is desired.

I claim as my invention:

1. A process for purifying titanium sulphate solutions to remove lead sulphate impurities present therein, which comprises contacting said solution without substantially reducing its acidity with an alkaline earth metal sulphate from the group consisting of barium and strontium, said sulphate having been generated within said solution and being at a concentration ranging from substantially 1 to 10 g. per liter of the alkaline earth metal for each 100 g. of $TiO_2$ present, agitating the resulting suspension, and thereafter removing the alkaline earth sulphate from said solution.

2. A process for purifying titanium sulphate solutions to remove lead sulphate impurities present therein, which comprises, contacting said solution without substantially reducing its acidity with a nascent barium sulphate at a concentration ranging from substantially 1 to 10 g. per liter of the barium for each 100 g. of $TiO_2$ present, agitating the resulting suspension, and thereafter removing the barium sulphate formed within said solution from said solution.

3. A process for purifying titanium sulphate solutions to remove lead sulphate impurities present therein, which comprises contacting said solution with strontium sulphate formed in said solution and being at a concentration ranging from substantially 1 to 10 g. per liter of the strontium for each 100 g. of $TiO_2$ present, agitating the resulting suspension, and thereafter removing the strontium sulphate from said solution.

4. A process for removing impurity lead sulphate from hydrolyzable titanium sulphate solutions containing the same which comprises prior to hydrolysis incorporating in said solution while maintaining an active acid content in excess of substantially 3 g. equivalents for each gram atom of titanium contained in the solution, a soluble reactive barium compound for reaction with an equivalent amount of sulphuric acid present therein, agitating the resulting suspension of titanium sulphate solution and nascent barium sulphate for a period ranging from 3 to 6 hours and thence separating said barium sulphate from said solution.

5. A process for removing impurity lead sulphate from hydrolyzable titanium sulphate solutions containing the same, which comprises prior to hydrolysis incorporating in said solution a small amount of a soluble reactive strontium compound for reaction with an equivalent amount of sulphuric acid present therein, agitating the resulting suspension of titanium sulphate solution and nascent strontium sulphate for a period ranging from 3 to 6 hours and thence separating said strontium sulphate from said solution.

6. A process for removing impurity lead sulphate from hydrolyzable titanium sulphate solutions containing the same which comprises prior to hydrolysis incorporating in said solution while maintaining an active acid content in excess of substantially 3 g. equivalents for each gram atom of titanium contained in the solution, a soluble reactive barium compound in an amount ranging from substantially 1 to 10 g. per liter of barium for each 100 g. of $TiO_2$ present for reaction with an equivalent amount of sulphuric acid present therein, agitating the resulting suspension of titanium sulphate solution and nascent barium sulphate for a period ranging from 3 to 6 hours at an elevated temperature and thence separating said barium sulphate from said solution.

7. A process for purifying an acidic, titanium salt-containing liquor to render the same substantially free of lead impurities present therein, which comprises subjecting said liquor without substantially reducing its acidity to contact with an alkaline earth metal sulphate from the group consisting of barium and strontium, said sulphate being formed within said solution and ranging in amount from about 1 to 20 g./l. of the alkaline earth metal for each 100 g. of $TiO_2$ present, and thereafter separating the sulphate from said liquor.

8. A process for purifying titanium salt solutions to render the same substantially free of lead contaminants present therein, comprising generating within said solution without substantially reducing the acidity thereof an alkaline earth metal sulphate from the group consisting of barium and strontium, the amount of said sulphate ranging from about 1–10 g. per liter of the alkaline earth metal for each 100 g. of $TiO_2$ present, and subsequently separating said sulphate from said solution.

9. A process for removing impurity lead sulphate from hydrolyzable titanium sulphate solutions containing the same which comprises prior to hydrolysis incorporating in said solution, while maintaining an active acid content in excess of substantially 3 g. equivalents for each gram atom of titanium present in said solution, a soluble alkaline earth metal compound from the group consisting of barium and strontium, said compound being at a concentration ranging from substantially 1 to 10 g. per liter of alkaline earth metal for each 100 g. of $TiO_2$ present, in order to react said soluble alkaline earth metal compound with an equivalent amount of sulphuric acid present in said titanium sulphate solution, agitating the resulting suspension of titanium sulphate and nascent alkaline earth metal sulphate for a period ranging from about 3–6 hours, and thereafter separating said alkaline earth metal sulphate from said solution to recover the purified liquor.

10. A process for removing impurity lead sulphate from hydrolyzable titanium sulphate solutions containing the same, which comprises prior to hydrolysis incorporating in said solution, while maintaining an active acid content in excess of substantially 3 g. equivalent for each gram atom of titanium present in said solution, a soluble alkaline earth metal compound from the group consisting of barium and strontium, said compound being at a concentration ranging from substantially 1–10 g./l. of alkaline earth metal for each 100 g. of $TiO_2$ present, in order that said compound may react with an equivalent amount of sulphuric acid present in said solution, agitating the resulting suspension of titanium sulphate solution and nascent alkaline earth metal sulphate for a period ranging from about 3–6 hours at an elevated temperature, and then separating said alkaline earth metal sulphate from said solution.

CHARLES RUSSELL WICKER.

CERTIFICATE OF CORRECTION.

Patent No. 2,326,592.  August 10, 1943.

CHARLES RUSSELL WICKER.

It is hereby certified that error appears in the printed specification of the above numbered patent requiring correction as follows: Page 3, second column, line 34, claim 2, after the word "sulphate" insert --formed within said solution and being--; line 38, after "sulphate" strike out "formed within said solution"; and that the said Letters Patent should be read with this correction therein that the same may conform to the record of the case in the Patent Office.

Signed and sealed this 5th day of October, A. D. 1943.

(Seal)

Henry Van Arsdale,
Acting Commissioner of Patents.